United States Patent [19]

Rowe

[11] 4,248,204

[45] Feb. 3, 1981

[54] SOLAR ROCK FIREPLACE HEATING SYSTEM

[76] Inventor: Herman D. Rowe, 3148 Glouchester, Troy, Mich. 48084

[21] Appl. No.: 10,715

[22] Filed: Feb. 9, 1979

[51] Int. Cl.³ .......................... F24B 7/00; F28D 13/00
[52] U.S. Cl. .................................. 126/121; 126/400; 126/72; 165/104 S
[58] Field of Search ............ 165/104 S, DIG. 2, 400; 126/122, 92 R, 120, 121, 72; 237/55, 1 A; 122/494, 35, 135 A

[56] References Cited

U.S. PATENT DOCUMENTS

| | | | |
|---|---|---|---|
| 358,065 | 2/1887 | O'Brien | 126/99 R |
| 553,750 | 1/1896 | Dohrman | 237/51 |
| 2,622,587 | 12/1952 | Dupler | 126/121 |
| 4,010,728 | 3/1977 | Hempel | 126/120 |
| 4,121,563 | 10/1978 | Gold | 126/400 |

FOREIGN PATENT DOCUMENTS

43-13541  8/1968  Japan ..................................... 165/104 S

Primary Examiner—Samuel Scott
Assistant Examiner—G. Anderson
Attorney, Agent, or Firm—Cullen, Sloman, Cantor, Grauer, Scott & Rutherford

[57] ABSTRACT

A solar rock fireplace, to be connected to a forced air heating system, includes an enclosed heating chamber, a firebox where wood or other combustible material may be burned, a flue extending from the firebox along the length of the heating chamber, and a plurality of solar rocks positioned interiorly of the heating chamber and exteriorly of the firebox and flue. When material is burned in the firebox, the solar rocks are heated. When the air is circulated by the forced air heating system, the air flowing through the heating chamber is heated by the solar rocks.

10 Claims, 8 Drawing Figures

SOLAR ROCK FIREPLACE HEATING SYSTEM

BACKGROUND OF THE INVENTION

This invention relates generally to an improved heating system and, more particularly, to a solar rock fireplace system to be connected to a forced air heating system.

Many houses have fireplaces and, therefore, the present invention will be described in such an environment. It may be appreciated, however, that the present invention may be utilized in virtually any building, residential, industrial or commercial, which includes a forced air heating system.

The burning of wood, paper logs or other material in a fireplace has long been recognized as a technique for heating a house. In addition, the interconnection of a fireplace to a forced air heating system has been disclosed in earlier patents such as U.S. Pat. No. 1,722,560 issued to Cornelius in 1929. However, the use of a fireplace as part of a home heating system has suffered from two serious disadvantages.

The first disadvantage is that combustion in the fireplace causes a slight negative pressure or draft in the house as the hot gases flow upwardly through the flue and chimney. To equalize this negative pressure, cold air from outside the house seeps into the house through cracks around windows and around doors. Thus a fireplace system usually has, as one of the attendant disadvantages, the introduction of additional cold air into the house.

A second and even more significant disadvantage has been the need to burn material in the fireplace constantly to generate heat for the house because as soon as the combustion stopped, there no longer was any source of hot air for circulation through the house. In other words, when there was no fire in the fireplace there was a rapid drop in the temperature of the air being circulated. I have recognized that the problem is the inability of a fireplace to store the heat which is generated by combustion.

Solar rocks, or washed gravel, have been known for their ability to store heat. However, the use of solar rocks has heretofore been limited to the heating of the solar rocks in an enclosed chamber in conjunction with solar heat collectors or solar panels.

The present invention is the first instance in which solar rocks are heated other than by energy from the sun and then used in conjunction with a forced air heating system to heat a house. This is of particular importance since, in many geographical regions, the energy from the sun used with solar panels or solar collectors to heat solar rocks, is insufficient to maintain the house at the desired temperature, either because of the cold climate, or the number of cloudy days which limit the ability of the energy from the sun to heat the solar rocks, or both.

The present invention overcomes the disadvantages of prior art fireplace heating systems by providing a fireplace heating system which stores the heat generated by the combustion in the fireplace until the heat is needed for heating the house. In addition, the present invention overcomes the limitation on the use of solar panels to heat solar rocks.

SUMMARY OF THE INVENTION

The present invention overcomes the heretofore mentioned disadvantages of fireplace heating systems and the limitations on the use of solar rocks, by providing a solar rock fireplace heating system to be connected to a forced air heating system of a house or the like. The solar rock system includes a heating chamber, where air is to be heated, a firebox interiorly of the heating chamber in which the combustion takes place, and a flue extending along the length of the heating chamber. A plurality of solar rocks are positioned exteriorly of the firebox and flue and interiorly of the heating chamber. When material is burned in the firebox, the solar rocks are heated and when it is desired to heat the house, the forced air heating system is activated to circulate air through the heating chamber and through the forced air heating system. As the air is circulated through the heating chamber, the air is heated from the heat stored in the solar rocks.

The present invention also provides for maintaining the house under a slight positive pressure rather than a negative pressure to avoid the drafts of cold air seeping into the house.

Furthermore, the present invention provides, as an option, for the recirculation and reheating of air within the heating chamber to increase the temperature of the air.

Furthermore, the present invention provides for the introduction of fresh air into the heating chamber to make up for air lost such as by the seepage of air outwardly of the house.

Finally the present invention provides a solar rock fireplace system where the heat generated by combustion in the fireplace may be stored rather than used immediately, and hence the fireplace need not burn material continuously even if heat is required.

BRIEF DESCRIPTION OF THE DRAWINGS

The foregoing advantages of the present invention, together with other objects and advantages which may be attained by its use, will become more apparent upon reading the following detailed description of the invention taken in conjunction with the drawings.

In the drawings, wherein like reference numerals identify corresponding parts.

DETAILED DESCRIPTION OF THE INVENTION

Figure 1:
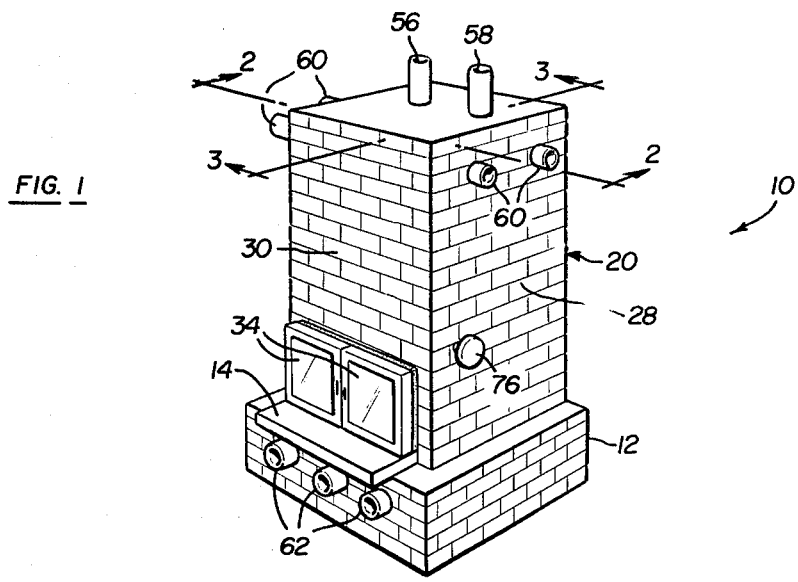
FIG. 1 is a perspective illustration of a solar rock fireplace heating system according to the principles of the present invention.

The solar rock fireplace heating system 10 of the present invention is shown as mounted on a generally rectangular pedestal 12 of the type which includes a front apron 14. This type of pedestal and apron per se are commonly utilized in fireplaces which are constructed in buildings.

The system 10 of the present invention includes an elongated generally rectangular heating chamber or chimney 20 which may be made of brick or cement block. The heating chamber 20 is mounted on the pedestal and apron and the heating chamber includes a top 22, a bottom 24 which is actually the top of the pedestal, side walls 26 and 28 and front and rear walls 30 and 32, respectively. The lower edge of the front wall 30 is provided with an access opening to the heating chamber which access opening is covered by a hinged glass door 34. A suitable seal of asbestos 36 extends around the access opening, between the door 34 and the front of the heating chamber to provide an air tight seal.

A firebox 40 is positioned interiorly of the heating chamber 20 at the bottom thereof. The firebox 40 is completely enclosed including side walls 41, a rear wall, bottom, and top, and the firebox, which is made of metal, is generally rectangular in plan view with the top tapering upwardly and inwardly. Combustion such as the burning of wood or of paper logs is contained within and confined within the firebox 40. The front of the firebox is coterminus with the access opening of the heat chamber and thus the door 34 permits access to the interior of the firebox.

Means are provided for removing the by-products of combustion from within the firebox 40. Specifically, means are provided for removing both the solid by-products and the fumes or gases which result from the combustion.

For removal of the solid by-products, or ashes, a duct 42 is provided at the rear of the firebox 40 and this duct extends through an opening 44 in the rear 32 of the heating chamber. The opening 44 may be closed by a door or shutter 46, and the door, opening and duct are of a sufficient size to permit easy access into the firebox for the removal of ash and the like.

Figure 2:
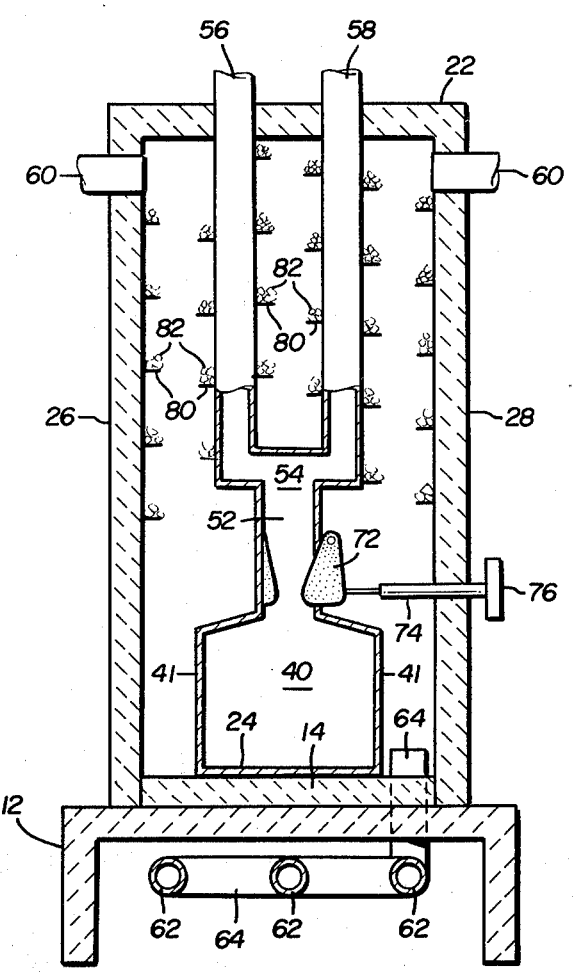
FIG. 2 is a front elevation view of the fireplace heating system of FIG. 1, partly in cross section as seen in the plane of arrows 2—2 of FIG. 1.
Figure 3:
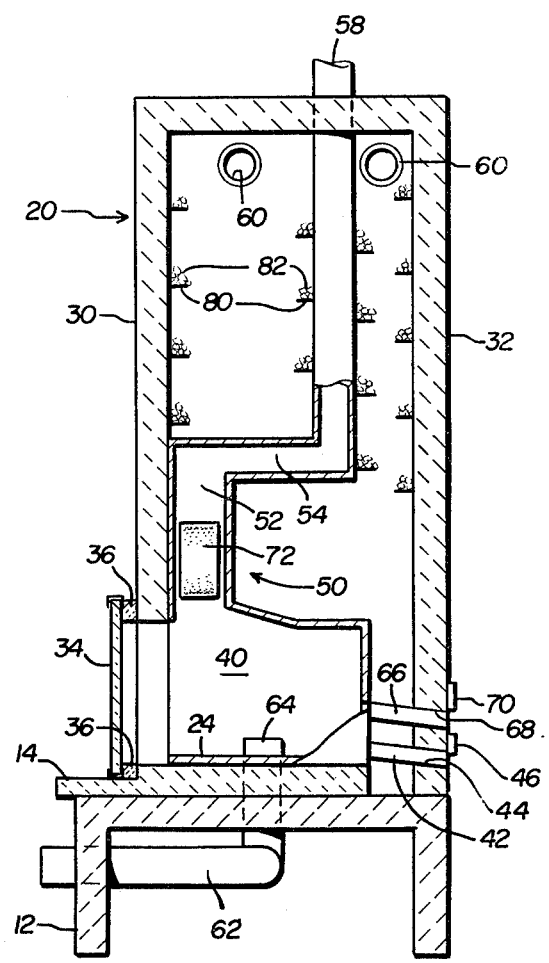
FIG. 3 is a side elevation view, partly in section, of the solar rock fireplace heating system of FIGS. 1 and 2 as seen in the plane of arrows 3—3 of FIG. 1.
Figure 4:
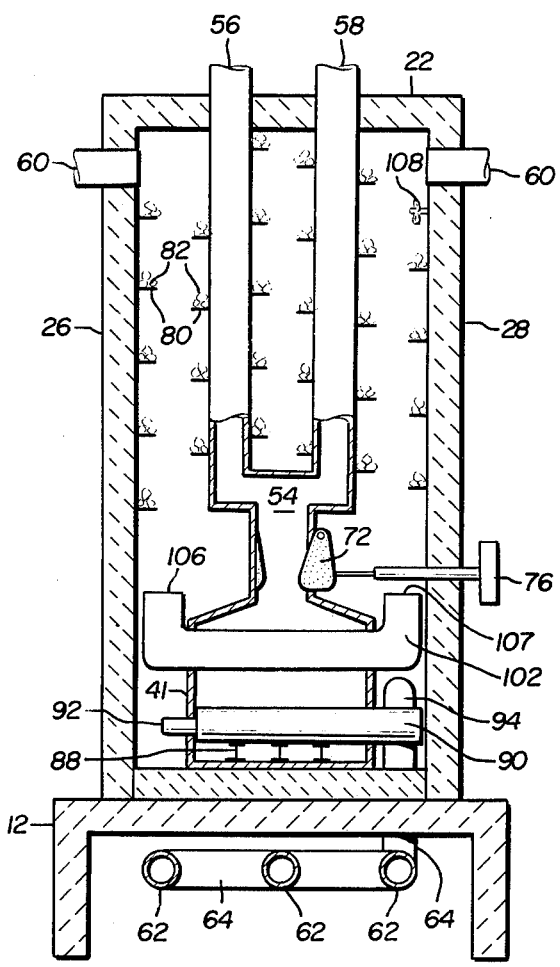
FIG. 4 is a front elevation view, and similar to FIG. 2, partly in section, of another embodiment of the fireplace heating system including upper and lower manifolds for additional heating of the air in the heating chamber.
Figure 5:
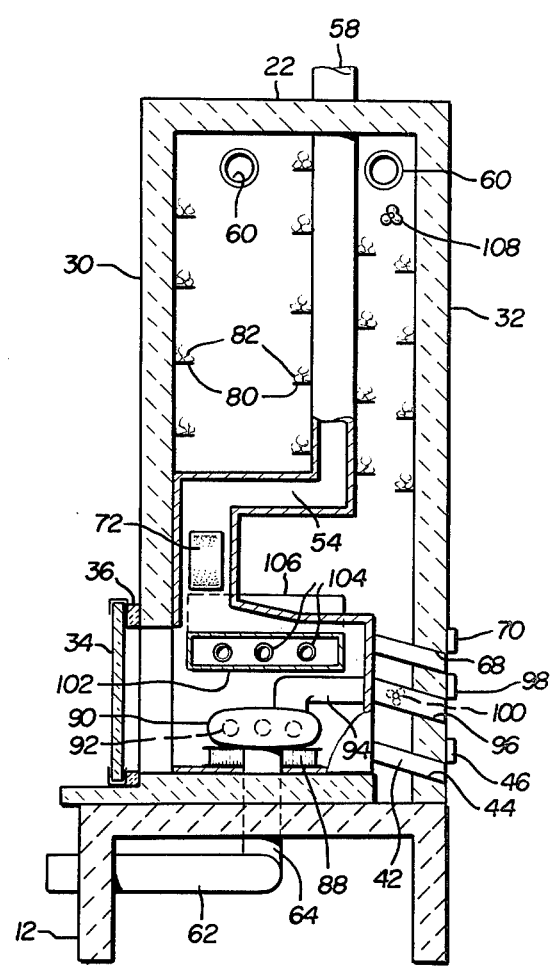
FIG. 5 is a side elevation view, partly in section, and similar to FIG. 3, of the embodiment of the fireplace heating system of FIG. 4.
Figure 7:
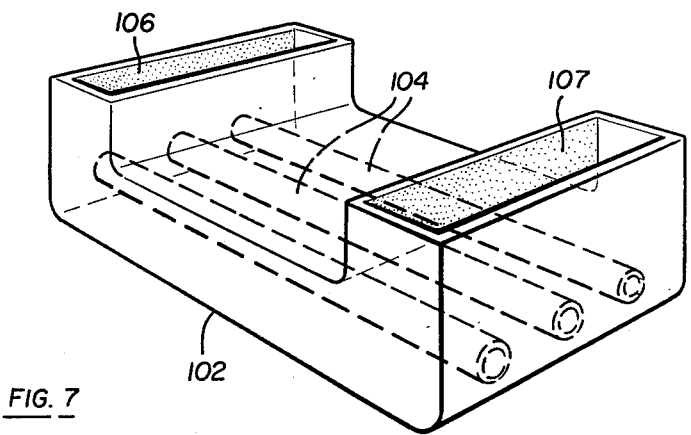
FIG. 7 is a perspective illustration of the upper manifold of the embodiment of FIGS. 4 and 5.
Figure 6:
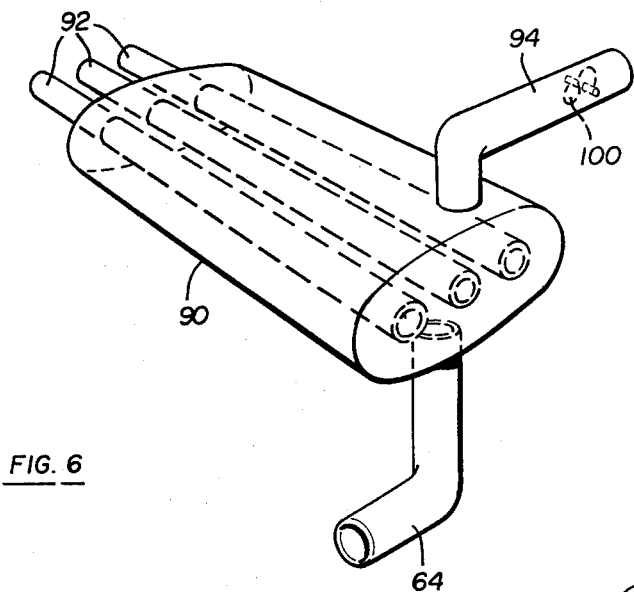
FIG. 6 is a perspective illustration of the lower manifold of the embodiment of FIGS. 4 and 5.

Flue means 50 are also provided for removing gas and fumes from the firebox and conveying the gas and fumes to the outside atmosphere. In the embodiment of FIGS. 2 and 3, the flue means 50 includes a first vertical flue section 52 extending upwardly from and communicating with the top of the firebox, a second horizontal flue section 54, extending generally from the front of the heating chamber toward the rear of the heating chamber, and a bifurcated leg comprising a pair of vertical flue sections 56 and 58 extending upwardly from the horizontal section 54 along the length of the heating chamber 20 and extending through suitable apertures in the top 22 of the heating chamber and thereafter opening into the atmosphere. The flue means 50 as heretofore described thus provides a continuous path for the escape of flue gases and fumes from the firebox into the atmosphere. In the preferred embodiments, the flue means is made of metal and forms a continuous flow path, and all of the gas and fumes from the firebox is confined within the flue means 50.

According to the principles of the present invention, the solar rock fireplace of the present invention is adapted to be interconnected to a forced air heating system. As illustrated in FIGS. 1, 2 and 3, the heating chamber 20, at the upper portion thereof, includes a plurality of ducts 60 which serve as hot air outlet ducts and are connected to the forced air heating system of the house. In addition, positioned interiorly of the pedestal 12 are a plurality of cold air return ducts 62, interconnected by a manifold 64, which manifold opens into the interior of the heating chamber 20 near the bottom thereof.

To provide air for the burning of the logs or other combustible material, a fresh air duct 66 is provided from the rear of the firebox 40. The duct 66 terminates in an opening 68 in the rear wall 32 of the heating chamber and may be opened and closed by a door or shutter 70. If the front door 34 is closed, closing the rear door 70 will extinguish the fire in the firebox.

To further control combustion within the firebox 40 a venturi damper means 72 is provided in the first vertical portion 52 of the flue means 50. This venturi damper means 72 may be opened and closed by a venturi control 74 including an elongated threated adjustment mechanism extending through an opening in the side wall of the heating chamber and terminating in a knurled adjustment knob 76. Rotation of the knob in a first direction rotates the control 74 to close the venturi while rotation of the knob 76 in the opposite direction serves to open the venturi.

It is contemplated, according to the present invention, that the venturi should be initially fully opened and once the fire has started, the venturi may be closed down to approximately 80 percent of the initial cross-sectional area of the vertical portion 52 of the flue means 50. The provision of the venturi damper permits a slower rate of combustion thus increasing the efficiency of the present system.

Means are provided for heating the air within the heating chamber 20. Specifically, a plurality of perforated metal shelves 80 are provided interiorly of the heating chamber and exteriorly of both the firebox and the flue means. These perforated metal shelves are horizontally disposed and extend inwardly from each of the front, rear and side walls of the heating chamber and extend outwardly from the bifurcated vertical members 56 and 58 of the flue means. A plurality of solar rocks, also known as washed gravel 82 are positioned on each of these perforated shelves.

As the logs burn in the firebox 40, the firebox and flue means 50 become hot and, by conduction of the metal parts, the solar rocks are heated. The heat generated by combustion may thus be stored in the solar rocks. Furthermore, after the fire has been ignited, the front door 34 may be closed to minimize heat losses and air loss.

When it is desired to heat the house, the forced air system is activated. Air circulates upwardly through the heating chamber 20 and the air in the heating chamber is heated by convection from the solar rocks, regardless of whether there is a fire in the firebox. In operation, the fan normally associated with a forced air heating system may be employed and this fan forces the air along the cold air return ducts, up through the heating chamber wherein the air is heated by convection from the solar rocks, and thereafter through the outlet ducts 60 and then through the forced air heating system of the house.

Thus the present system may be added to a house which already has a forced air heating system and, the solar rock fireplace will be used in lieu of the source of heat associated with such an existing forced air heating system.

Having thus described a first embodiment of the present invention, reference should now be had to the remaining Figures for a description of various options of the present invention. These options and modifications need not be utilized collectively but may be individually selected depending upon the particular benefit provided by each such option.

A first optional feature has, as its benefit, higher temperature of the air within the heating chamber. A plurality of I-beams or the like 88 are provided in the bottom of the firebox 40 and a manifold 90 is placed on top of these I-beams. The manifold 90, which is closed at both ends, includes, interiorly thereof, a plurality of elongated hollow pipes 92 and the manifold and pipes extend horizontally across the firebox and extend through both side walls 41 of the firebox. Thus the manifold 90 and pipes 92 are longer than the width of the firebox 40. Suitable insulating seals are provided where the manifold extends through each firebox side wall 41. Pipes 92 extend through one end of the manifold and open into the heating chamber.

The manifold further includes, at the other end thereof, a duct 94 extending through the rear of the firebox 40 and thereafter extending through an opening 96 in the rear wall 32 of the heating chamber and opening into the atmosphere. The opening 96 may be selectively opened and closed by a suitable door or shutter 98. Finally, the cold air return manifold 64 is also connected to the manifold 90.

In operation, the combustible material is placed on the manifold 90 and air enters the manifold 90 and the pipes 92 and is heated to an extremely high temperature because of the close proximity of the pipes, and the air in the pipes, to the fire itself. Thus the air is heated to a much higher temperature and this reduces the use of the heat stored in the solar rocks since the air is being directly heated by the fire in the firebox. This is referred to as super-heating the air, and may be accomplished regardless of whether the door 98 is open or shut.

Yet another feature is the provision of an electric fan 100 in the duct 94 to force or induce an inward draft of air into the firebox. By suitably adjusting the speed of the fan 100, the air entering the heating chamber will be at a slightly greater flow rate than the air which might otherwise leak into the house by seepage around doors, windows and the like. Hence there is a slight positive air pressure within the house and warm air from inside of the house will seep outwardly around doors and windows rather than cold air from outside of the house seeping inwardly around the doors and windows.

Yet another optional feature of the present invention is the provision of a second manifold 102 having a plurality of hollow pipes 104 therein and extending across the width of the firebox and through both side walls 41 thereof. This second manifold and its associated pipes is positioned adjacent the top of the firebox. One end of the manifold 102 opens as at 106 into the heating chamber on one side of the firebox and the other end of the manifold and pipes open into the heating chamber on the opposite side of the firebox as at 107. A fan 108 may be provided near the top of the heating chamber and operation of the fan 108 serves to circulate the air downwardly through the heating chamber and into the opening 106 of the upper manifold 102. This forces air, which may have been initially heated by the solar rocks, back through the firebox, interiorly of the pipes, to be further heated by passage through the firebox within the pipes and manifold. This also serves to heat the air within the heating chamber to an extremely high temperature. The air within the heating chamber may be heated as high as 400 degrees by the present system.

Figure 8:
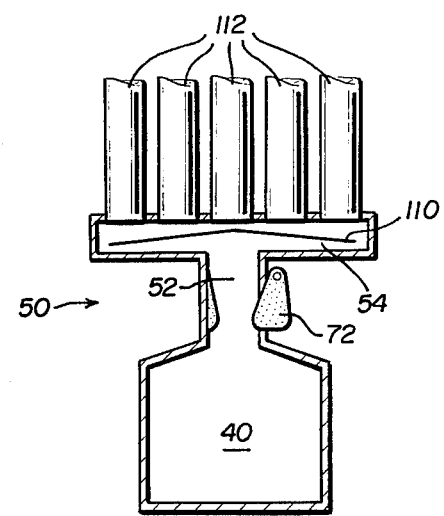
FIG. 8 is a diagrammatic illustration of an optional firebox and flue arrangement for the fireplace heating system of the present invention.

Referring now to FIG. 8, yet another embodiment of the firebox and flue means is illustrated. In the embodiment of FIG. 8, the flue means 50 which extends above the firebox 40 includes a vertical flue portion 52 and a horizontal flue portion 54 containing an interior baffle 110. The horizontal flue portion 54 serves as a manifold and a plurality of vertical flue members 112 extend upwardly from the manifold 54. These vertical flue members 112 extend the length of the heating chamber, through the top 22 of the heating chamber, and open into the atmosphere. Since the shelves 80 and solar rocks 82, according to the principles of the present invention, are positioned not only on the interior four walls of the heating chamber but also around the circumference of the flues, it may be appreciated that the embodiment of FIG. 8 provides greater cross-sectional area for placement of shelves and solar rocks. In addition, the baffle 110 within the manifold 54 provides for a disbursement of the heat throughout all of the flue members 112 thus providing a more even heating arrangement.

The foregoing is a description of the preferred embodiment of the present invention together with various options and alternative embodiments. Many changes may be made without departing from the spirit and scope of the present invention. For example, each of the shutters or doors may be electrically controlled as may be the venturi damper 72. The present system may be interconnected to a household forced air heating system including the thermostat thereof so that the thermostat, which controls the operation of the furnace fan, may be utilized to regulate the circulation of hot air from the heating chamber through the house.

In addition, solar panels may be employed at the top of the heating chamber 20 so that solar energy may be used to heat the solar rocks, thus reducing the amount of combustible material which is burned in the fireplace. The flue may have a plurality of metal fins to increase the rate at which heat is transferred by conduction from the flue to the solar rocks.

Furthermore, a heating chamber with its solar rocks may be constructed around an existing wood burning stove. The stove will serve the combined function of a firebox and flue, and a duct system may thus be constructed and interconnected to the heating chamber. Thus homes which have wood burning stoves may be modified, without the actual construction of a fireplace, to reap the benefits of the present invention.

Finally, the rear wall 32 may be provided with access doors of the type usually associated with grainery bins. This will provide complete access to the solar rocks and interior of the heating chamber.

Thus the present invention should be limited only by the scope of the following claims.

What is claimed is:

1. A fireplace system adapted to be connected to a forced air heating system, the forced air heating system of the type which includes hot air outlet ducts and cold air return ducts, the fireplace system comprising:

an enclosed air heating chamber adapted to be connected to the forced air heating system, said heating chamber including an access opening and means for sealing said opening to provide an air tight seal;

a firebox positioned interiorly of the heating chamber for containing and confining the burning of combustible material therein;

flue means connected to said firebox and extending along the length of said heating chamber, said flue means further extending through said heating chamber into the atmosphere;

heat storing members positioned exteriorly of both said flue means and said firebox and interiorly of said heating chamber;

said heat storing members heated by the combustion of material in said firebox; and said heat storing members for heating air in said heating chamber;

said heating chamber including a fresh air inlet; and means for introducing fresh air from said inlet into said heating chamber and into said forced air heating system for maintaining said heating chamber and said forced air heating system under slight positive air pressure; and said heating chamber including a plurality of hollow pipes positioned adjacent the bottom of said firebox, said hollow pipes being substantially enclosed by a manifold, said hollow pipes extending through said firebox with both ends of each of said hollow pipes in the heating chamber so that air is heated in the pipes during the burning of combustible material in the firebox, said fresh air inlet being in communication with said manifold and said plurality of hollow pipes, and said manifold supporting said combustible material during the burning thereof such that the air within said pipes is heated to a high temperature.

2. The invention as defined in claim 1 wherein said flue means includes a bifurcated flue extending from said firebox along the length of said heating chamber for increasing the surface area of said flue means proximate said heat storing members.

3. The invention as defined in claim 1 wherein said flue means includes a manifold connected to said firebox and a plurality of exhaust flues extending from said manifold along the length of said heating chamber for increasing the surface area of said flue means proximate said heat storing members.

4. The invention as defined in claim 3 wherein said flue means manifold further includes a baffle to distribute heat to the plurality of exhaust flues.

5. The invention as defined in claim 1 wherein said flue means includes an adjustable venturi damper for controlling the rate of burning of said combustible material.

6. The invention as defined in claim 1 wherein said firebox includes an ash removal outlet.

7. The invention as defined in claim 1 wherein said fresh air introducing means includes a fan for drawing fresh air from said fresh air inlet into said heating chamber.

8. The invention as defined in claim 1 wherein said fresh air inlet is in communication with the cold air return ducts of the forced air heating system.

9. The invention as defined in claim 1 wherein said heating chamber includes a plurality of hollow pipes extending through said firebox adjacent the top thereof, each end of each of said hollow pipes opening into the heating chamber, to reheat air in said heating chamber during the burning of combustible material in the firebox.

10. The invention as defined in claim 9 and further including a fan to circulate air in said heating chamber so that the air in said heating chamber enters said hollow pipes adjacent the top of said firebox.

* * * * *